(12) United States Patent
Horio et al.

(10) Patent No.: US 7,916,457 B2
(45) Date of Patent: Mar. 29, 2011

(54) MULTI-LAYERED SOLID ELECTROLYTIC CAPACITOR AND METHOD OF MANUFACTURING SAME

(75) Inventors: Kazutoyo Horio, Saga (JP); Shinji Arimori, Takeo (JP)

(73) Assignees: Sanyo Electric Co., Ltd., Moriguchi-shi, Osaka (JP); Saga Sanyo Industries Co., Ltd., Kishima-gun, Saga (JP)

( * ) Notice: Subject to any disclaimer, the term of this patent is extended or adjusted under 35 U.S.C. 154(b) by 196 days.

(21) Appl. No.: 11/914,184

(22) PCT Filed: Dec. 26, 2005

(86) PCT No.: PCT/JP2005/023731
§ 371 (c)(1),
(2), (4) Date: Nov. 12, 2007

(87) PCT Pub. No.: WO2006/120779
PCT Pub. Date: Nov. 16, 2006

(65) Prior Publication Data
US 2009/0080146 A1    Mar. 26, 2009

(30) Foreign Application Priority Data

May 13, 2005   (JP) ................................. 2005-140992

(51) Int. Cl.
*H01G 4/228* (2006.01)
*H01G 9/00* (2006.01)
*H01G 5/38* (2006.01)
*H01G 9/10* (2006.01)
*H05K 5/03* (2006.01)

(52) U.S. Cl. ........ 361/541; 361/540; 361/538; 29/25.03

(58) Field of Classification Search ................... 361/541, 361/533, 540, 535, 532, 528, 523, 538; 29/25.03
See application file for complete search history.

(56) References Cited

U.S. PATENT DOCUMENTS

| 5,377,073 A | * | 12/1994 | Fukaumi et al. .............. 361/540 |
| 6,343,004 B1 |   | 1/2002  | Kuranuki et al. |

(Continued)

FOREIGN PATENT DOCUMENTS

JP         01-171223 A      7/1989

(Continued)

OTHER PUBLICATIONS

International Search Report of PCT/JP2005/023731, date of mailing Mar. 28, 2006.

(Continued)

*Primary Examiner* — Eric Thomas
*Assistant Examiner* — David M Sinclair
(74) *Attorney, Agent, or Firm* — Westerman, Hattori, Daniels & Adrian, LLP

(57) ABSTRACT

A multi-layered solid electrolytic capacitor including capacitor elements, each comprising an anode body having an anode portion and a cathode portion having a dielectric oxide film and a cathode layer formed in succession on a surface of the anode body, the capacitor elements being stacked on top of one another and the anode portions being weld-secured to anode mounting surfaces of anode mounting parts provided in an anode terminal. The multi-layered solid electrolytic in which the anode mounting parts are provided such that the anode mounting parts are disposed parallel to each other, and adjacent anode mounting parts are joined to each other by a joint part.

20 Claims, 17 Drawing Sheets

U.S. PATENT DOCUMENTS

| | | | |
|---|---|---|---|
| 6,816,358 B2 * | 11/2004 | Kida et al. | 361/540 |
| 6,912,117 B2 * | 6/2005 | Arai et al. | 361/523 |
| 7,016,179 B2 * | 3/2006 | Ando | 361/523 |
| 7,138,713 B2 * | 11/2006 | Kida et al. | 257/732 |
| 7,161,796 B2 * | 1/2007 | Deisenhofer et al. | 361/540 |
| 7,190,571 B2 * | 3/2007 | Heusmann et al. | 361/523 |

FOREIGN PATENT DOCUMENTS

| | | | |
|---|---|---|---|
| JP | 01278011 A * | 11/1989 | |
| JP | 06005477 A * | 1/1994 | |
| JP | 11135367 A | 5/1999 | |
| JP | 2000138138 A | 5/2000 | |
| JP | 200345755 A | 2/2003 | |
| WO | WO 2004010756 A2 * | 1/2004 | |

OTHER PUBLICATIONS

Chinese Office Action dated Aug. 23, 2010, issued in corresponding Chinese Patent Application 200580049776.1.

Japanese Office Action dated Oct. 12, 2010, issued in corresponding Japanese Patent Application No. 2007-526813.

* cited by examiner

PRIOR ART

MULTI-LAYERED SOLID ELECTROLYTIC CAPACITOR AND METHOD OF MANUFACTURING SAME

TECHNICAL FIELD

The present invention relates to multi-layered solid electrolytic capacitors and methods of manufacturing the same.

BACKGROUND ART

Multi-layered solid electrolytic capacitors according to the present invention are used as, for example, chip capacitors mounted on a printed circuit board. Among such multi-layered solid electrolytic capacitors, one employing as its solid electrolyte a TCNQ complex salt or a conductive polymer such as polypyrrole, polythiophene, polyfuran, and polyaniline has drawn attention. As the size reduction of electronic devices advances, demands for the solid electrolytic capacitor with a smaller size and a higher capacity have been escalating. In addition, the recent trend toward faster signal processing speed and lower power consumption in CPUs and the like requires higher frequency and larger current, and these requirements in turn create a strong demand for capacitors with lower ESR.

A conventional multi-layered solid electrolytic capacitor has been fabricated in the following manner. As illustrated in FIG. 15, a dielectric oxide film 42, a solid electrolyte layer 43, a carbon layer 44, and a silver paint layer 45 are successively formed over a portion of the surface of a valve metal 41 (e.g., aluminum) to prepare a capacitor element 46.

Next, as illustrated in FIG. 16, a plurality of the capacitor elements 46 in a stacked state are disposed on one surface of an anode mounting part 51 integrally formed with an anode terminal 52 and on one surface of a cathode mounting part 47 integrally formed with a cathode terminal 48, and thereafter covered with an exterior resin 54. Alternatively, as illustrated in FIG. 17, a plurality of the capacitor elements 46 in a stacked state are disposed on both surfaces of the anode mounting part 51 and on both surfaces of the cathode mounting part 47 and thereafter covered with an exterior resin 54. Through these processes, the multi-layered solid electrolytic capacitor has been fabricated.

When stacking the capacitor element 46, first, a capacitor element 46 is held at its cathode portion 46*b* (main body part) and conveyed and placed onto a lead frame. Thereafter, the anode portion 46*a* of the capacitor element 46 is connected to the anode terminal 52 by resistance welding, and then, the connected anode portion 46*a* of the capacitor element 46 is welded to the anode portion 46*a* of another capacitor element 46 to be stacked thereover. Meanwhile, the cathodes of the capacitor elements 46 are connected by conductive adhesive 57. The capacitor elements are stacked by repeating the above-described processes (see Patent Reference 1). The purpose of stacking the capacitor elements 46 is to improve the capacitor's capacitance characteristics and reduce its ESR.

[Patent Document 1] Japanese Published Unexamined Patent Application No. 11-135367

DISCLOSURE OF THE INVENTION

Problems to be Solved by the Invention

In the multi-layered solid electrolytic capacitor shown in FIG. 16, however, there is a large difference between the thickness L1 of the anode portion 46*a* and the thickness L2 of the cathode portion 46*b*, as shown in FIG. 15, in which the thickness of the anode portion 46*a* L10≈100 μm and the thickness L11 of the cathode portion 46*b*≈230 μm. Therefore, each of the capacitor elements 46 tends to tilt, causing a great mechanical stress. This is especially noticeable in a capacitor element 46 that is disposed more upward (i.e., disposed more distant from the anode mounting part 51). Moreover, there are large variations in the connecting strength caused by welding. For these reasons, the multi-layered solid electrolytic capacitors have the problem of a large number of LC defects. It should be noted that although only four capacitor elements 46 are stacked in the multi-layered solid electrolytic capacitor shown in FIG. 16, the just-mentioned problem will be more serious when a larger number of capacitor elements 46 are stacked.

On the other hand, in the multi-layered solid electrolytic capacitor shown in FIG. 17, the just-described problem is somewhat alleviated; however, since the multi-layered solid electrolytic capacitor has only one anode terminal 52, the load applied to the anode terminal 52 becomes large. As a consequence, mechanical stress is caused, and therefore, the just-described problem remains unresolved.

In view of the foregoing problems, it is an object of the present invention to reduce the mechanical stress in welding and to prevent tilting of the elements in relation to an increase in the number of layers so that LC defects are alleviated, whereby an increase in capacitance due to a greater number of layers can be achieved.

Means for Solving the Problems

In order to accomplish the foregoing object, the invention as set forth in claim 1 provides a multi-layered solid electrolytic capacitor comprising: a plurality of capacitor elements, each comprising an anode body having an anode portion and a cathode portion having a dielectric oxide film and a cathode layer formed in succession on a surface of the anode body, the plurality of capacitor elements being stacked on top of one another and the anode portions being weld-secured to anode mounting surfaces of anode mounting parts provided in an anode terminal, the multi-layered solid electrolytic capacitor characterized in that: a plurality of the anode mounting parts are provided therein, the anode mounting parts are disposed parallel to each other, and adjacent anode mounting parts are joined to each other by a joint part.

When a plurality of anode mounting parts are provided as in the just-described configuration, the stacked capacitor elements can be electrically connected to the anode mounting parts so that each group of the capacitor elements is connected to a respective one of the anode mounting parts. In this way, the number of the capacitor elements connected to each anode mounting part relatively reduces, making it possible to suppress the tilt of the capacitor elements that are disposed distant from the anode mounting part and to alleviate mechanical stress. Moreover, this also alleviates variations in the connecting strength, which results from welding. As a result, it becomes possible to prevent the occurrence of LC defects in the multi-layered solid electrolytic capacitor.

Furthermore, since the stacked capacitor elements are electrically connected to the anode mounting parts so that each group of the capacitor elements is connected to a respective one of the anode mounting parts, the electrical resistance within the capacitor is smaller than that in the conventional capacitor, so a good conduction condition can be maintained.

Moreover, since the anode mounting parts are connected by the joint part, the overall strength increases. In addition, the anode mounting parts can support respective anode portions, ensuring stable retention.

What is more, since the anode mounting parts are disposed parallel to each other, the capacitor elements connected to any of the anode mounting parts are layered in good order without any deformation. As a result, it becomes possible to prevent a size increase in the multi-layered solid electrolytic capacitor.

The invention as set forth in claim 2 is characterized in that, in the invention as set forth in claim 1, adjacent cathode portions of the capacitor elements are electrically connected to each other by a conductive adhesive, and a cathode mounting part electrically connected to a cathode terminal is electrically connected to a cathode portion of the capacitor element disposed on the cathode mounting part also by the conductive adhesive.

By adhesive-bonding the cathode portions to each other as well as the cathode mounting part and the cathode portion disposed on the cathode mounting part to each other, electrical conductivity between the cathodes of a plurality of capacitor elements is ensured.

The invention as set forth in claim 3 is characterized in that, in the invention as set forth in claim 1 or 2, an angle formed by the adjacent anode mounting parts and the joint part for joining the anode mounting parts is restricted to be a substantially right angle.

When the angle formed by the adjacent anode mounting parts and the joint part for joining the anode mounting parts is a substantially right angle, two anode mounting parts and the joint part form a substantially C-shape, making it possible to retain the three parts with one another firmly and to stack the anode portions of the capacitor elements on the anode mounting parts stably.

The invention as set forth in claim 4 is characterized in that, in the invention as set forth in any one of claims 1 through 3, the anode mounting surfaces of the adjacent anode mounting parts are opposed to each other, and the height of the joint part that joins the anode mounting parts having the anode mounting surfaces is controlled to be substantially the same as the total thickness of the capacitor elements existing between the adjacent anode mounting parts.

By controlling the height of the joint part that joins the anode mounting parts having the anode mounting surfaces to be substantially the same as the total thickness of the capacitor elements existing between the adjacent anode mounting parts, a gap can be prevented from forming between the capacitor elements, and therefore, the capacitor elements can be stacked more stably.

The invention as set forth in claim 5 is characterized in that, in the invention as set forth in any one of claims 1 through 4, notches are formed at boundaries between the joint part and the anode mounting parts.

By providing the notches in this way, the bending process for the lead frame provided with the anode mounting parts and the joint part may be performed more easily.

The invention as set forth in claim 6 is characterized in that, in the invention as set forth in any one of claims 1 through 3, opposite surfaces to the anode mounting surfaces of the adjacent anode mounting parts are disposed in contact with each other, and the height of the joint part that joins the anode mounting parts having the anode mounting surfaces is controlled to be substantially the same as the total thickness of two anode mounting parts.

When opposite surfaces to the anode mounting surfaces of the adjacent anode mounting parts are disposed in contact with each other, in other words, when the lead frame is bent over in an inside-out condition, the space required for the bending is less, and therefore, the size of the multi-layered solid electrolytic capacitor can be reduced.

The invention as set forth in claim 7 is characterized in that, in the invention as set forth in claim 6, a notch is formed at a center part of the joint part.

By providing a notch in this way, the bending process for the lead frame may be performed more easily.

The invention as set forth in claim 8 is characterized in that, in the invention as set forth in any one of claims 1 through 7, at a boundary of the anode terminal to the anode mounting part, a restricting wall portion is formed along the same direction as the stacking direction of the capacitor elements.

When the restricting wall portion is formed along the same direction as the stacking direction of the capacitor elements, in other words, when the lead frame is formed by a bending process, the strength of the lead frame increases, making it possible to retain the capacitor elements more firmly. Moreover, positioning of the capacitor elements with respect to the lead frame becomes easy.

The invention as set forth in claim 9 is characterized in that, in the invention as set forth in any one of claims 1 through 8, wherein both adjacent anode terminals are bent-formed in an angular C-shape, and the adjacent anode terminals are weld-secured to each other at the bent portions.

By welding the bent portions in this way, the strength of the frame itself can be enhanced, and therefore, the capacitor elements can be retained stably.

The invention as set forth in claim 10 is characterized in that, in the invention as set forth in any one of claims 2 through 9, the same number of cathode mounting parts as that of the anode mounting parts is provided.

When the same number of cathode mounting parts as that of the anode mounting parts is provided as in the just-described configuration, the capacitor elements can be retained more firmly.

In order to accomplish the foregoing object, the invention as set forth in claim 11 is characterized by comprising: a first step of forming a dielectric oxide film and a cathode layer in succession over a portion of a surface of an anode body to prepare a plurality of capacitor elements each comprising a cathode portion and an anode portion in which the anode body is in an exposed state, and preparing a lead frame that has a plurality of anode mounting parts and in which adjacent anode mounting parts are joined by a joint part; a second step of stacking the plurality of capacitor elements on the anode mounting parts of the lead frame and weld-securing the anode mounting parts to an anode portion and the anode portions to each other; and a third step of bending the lead frame so that adjacent anode mounting parts are disposed parallel to each other.

The just-described method makes it possible to manufacture the multi-layered solid electrolytic capacitor according to claim 1 easily.

The invention as set forth in claim 12 is characterized in that, in the invention as set forth in claim 11, in the first step, the lead frame is prepared so that the length of the joint part is substantially the same as the total thickness of the capacitor elements existing between two anode mounting parts joined to the joint part, and in the third step, the lead frame is bent so that adjacent anode mounting surfaces are opposed to each other.

The just-described method makes it possible to manufacture the multi-layered solid electrolytic capacitor according to claim 4 easily.

The invention as set forth in claim 13 is characterized in that, in the invention as set forth in claim 11, in the first step, the lead frame is prepared so that the length of the joint part is substantially the same as the total thickness of two anode mounting parts, and in the third step, the lead frame is bent so that adjacent two opposite surfaces to the anode mounting surfaces are disposed in contact with each other.

The just-described method makes it possible to manufacture the multi-layered solid electrolytic capacitor according to claim 6 easily.

ADVANTAGES OF THE INVENTION

According to the present invention, mechanical stress in welding is suppressed, tilting of the elements is suppressed in relation to the increase in the number of layers so that LC defects are alleviated. Therefore, an increase in capacitance due to a greater number of layers is achieved while an improvement in the product yield rate is attained.

BEST MODE FOR CARRYING OUT THE INVENTION

Hereinbelow, a multi-layered solid electrolytic capacitor according to the invention and a method of manufacturing the capacitor are described in detail with reference to FIGS. 1 through 14. It should be construed that the multi-layered solid electrolytic capacitor and the method of manufacturing the capacitor according to the present invention are not limited to those shown in the following embodiments, and various changes and modifications are possible without departing from the scope of the invention.

(Structure of the Multi-Layered Solid Electrolytic Capacitor)

A multi-layered solid electrolytic capacitor according to the present invention has the following structure. As illustrated in FIG. 1, a plurality of capacitor elements 30 in a stacked state are covered with a synthetic resin housing, i.e., an exterior resin 8. Anode portions 30a of the capacitor elements 30 are connected to anode mounting parts 7a and 7b, which are connected to anode terminals 11, and cathode portions 30b (main body parts) of the capacitor elements 30 are connected to a cathode mounting part 6, which is connected to a cathode terminal 10. Specifically, the details are as follows.

The capacitor element 30 comprises, as illustrated in FIG. 2, a cathode portion 30b comprising a dielectric oxide film 32, a solid electrolyte layer 33 made of a polythiophene-based conductive polymer, a carbon layer 34, a silver paint layer 35, which are formed over part of the surface of an anode body 31 made of a valve metal (e.g., aluminum in this embodiment), and an anode portion 30a from which the anode body 31 is exposed.

The two anode mounting parts 7a and 7b, on which the anode portions 30a of the capacitor elements 30 are stacked and fixed, are opposed to each other at a predetermined gap, and the anode mounting parts 7a and 7b are joined by a joint part 9. Both the angle formed by the anode mounting part 7a and the joint part 9 and the angle formed by the anode mounting part 7b and the joint part 9 are configured to be substantially right angles so that the shape formed by the anode mounting parts 7a, 7b and the joint part 9 will be substantially an angular C-shape. The anode portions 30a of one group of the plurality of capacitor elements 30 are stacked and fixed onto the anode mounting part 7a, one of the anode mounting parts 7a and 7b, in an electrically-conductive state, while the anode portions 30a of the other group of the capacitor elements 30 are stacked and fixed onto the anode mounting part 7b, the other one of the anode mounting parts 7a and 7b, in an electrically-conductive state. Specifically, the anode portions 30a of a set of four capacitor elements 30 are weld-secured to one another, and an anode portion 30a adjacent to the anode mounting part 7a is weld-secured to the anode mounting part 7a; on the other hand, the anode portions 30a of another set of four capacitor elements 30 are weld-secured to one another, and an anode portion 30a adjacent to the anode mounting part 7b is weld-secured to the anode mounting part 7b. Each of the anode mounting parts 7a and 7b is connected to respective anode terminals 11, and a portion of one of the anode terminals 11 is exposed outside the exterior resin 8.

In addition, a bent surface 27a of the anode terminal 11 that is not extended outside the capacitor (the upper one of the anode terminals 11 in FIG. 1) and a bent surface 27b of the anode terminal 11 that is extended outside the capacitor (the lower one of the anode terminals 11 in FIG. 1) are weld-secured to each other, so that the strength of the capacity is improved.

The cathode portions 30b of the capacitor elements 30 are stacked on top of one another in an electrically-conductive state so as to be integrated with one another, and the cathode mounting part 6 and the cathode portion 30b that is on the cathode mounting part 6 are connected to each other so as to be electrically conductive to each other. Specifically, a conductive adhesive 25 is interposed between the cathode portions 30b and between the cathode mounting part 6 and the cathode portion 30b located on the cathode mounting part 6. The cathode mounting part 6 is integrally formed with the cathode terminal 10, a portion of which is exposed outside the exterior resin 8.

(Structure of the Lead Frame Used in the Present Embodiment)

One feature of the present embodiment is in the step of attaching capacitor elements 30 to a lead frame 12 to form a multi-layered solid electrolytic capacitor. A structure of the lead frame will be described below.

FIG. 3 shows a plan view of a metal plate 29 for forming the lead frame 12. First, a metal plate 29 made of copper as its main component is punched out to form openings 16. The metal plate 29 prepared in this manner has, between bridge portions 15, 15 formed in regions other than the openings 16 (i.e., in the remaining regions), the following parts: the anode mounting parts 7a and 7b, to which the anode portions 30a of the capacitor elements 30 are connected; the joint part 9 that connects the anode mounting parts 7a and 7b to each other; the cathode mounting part 6, to which the cathode portions 30b are connected; the anode terminal 11 that connects the anode mounting part 7b and a side rim part of the metal plate 29 to each other; and the cathode terminal 10 that connects the cathode mounting part 6 and a side rim part of the metal plate 29 to each other. It should be noted that one multi-layered solid electrolytic capacitor is formed by a lead frame 20 that exists between the bridge portions 15, 15.

Here, the specific construction of the regions near the cathode mounting part 6 and the anode mounting parts 7a and 7b will be described with reference to FIG. 4. As illustrated in FIG. 4, a first bent portion 17a that is bent upwardly at about 90° is formed in a boundary portion between the cathode terminal 10 and the cathode mounting part 6, and a second bent portion 17b that is bent outwardly at about 90° is formed at a location that is away from the first bent portion 17a by a distance L1. Likewise, a first bent portion 18a that is bent upwardly at about 90° is formed at a boundary portion between the anode terminal 11 and the anode mounting parts 7a, 7b, and a second bent portion 18b that is bent outwardly at about 90° is formed at a location that is away from the first bent portion 18a by a distance L2. The distance L1 (the height of a restricting wall portion 17c formed by the first bent portion 17a and the second bent portion 17b) and the distance L2 (the height of a restricting wall portion 18c formed by the first bent portion 18a and the second bent portion 18b) are configured to be substantially the same. Specifically, the distance L1 and the distance L2 are configured to be the length that substantially matches the total thickness of the cathode portions 30b of the capacitor elements 30 (four capacitor elements in the present embodiment) that are mounted on the anode mounting part 7a and the cathode mounting part 6, or the total thickness of the cathode portions 30b of the capacitor elements 30 (four capacitor elements in the present embodiment) that are mounted on the anode mounting part 7b. In addition, notches 13 are formed at boundaries between the anode mounting part 7a and the joint part 9 and between the anode mounting part 7b and the joint part 9, for making it easy to bend the lead frame 12. The distance L3 between the notches 13 is configured so as to be about two times the distance L1.

Moreover, the lead frame 12 has openings 28 formed in the vicinity of the restricting wall portion 17c within a bent surface 27c of the cathode terminal 10 and in the vicinities of the restricting wall portions 18c within the bent surfaces 27a and 27b of the anode terminal 11. In addition to the weight reduction resulting from the punch-out, these openings 28 serve to make the centering control easy by fitting the centers of the edges thereto when stacking the capacitor elements 30 and to achieve accuracy of the positioning of the overlaying positions in bending. Furthermore, the resin enters the openings 28 when filling the exterior resin 8, resulting in a firm bonding between the lead frame and the exterior resin 8.

In addition, the bent surfaces 27a, 27b form abutting surfaces when bending the lead frame 12 into an angular C-shape and consequently may serve to stabilize the angular C-shape formation so that no unexpected load will be applied from one set of the capacitor elements 30 to another.

(Manufacturing Method)

First, an aluminum foil is cut out into a plate-like shape to form an anode body 31. This is subjected to an electrolytic formation process in 0.001 wt % to 2 wt % of a phosphoric acid aqueous solution or an adipic acid aqueous solution, for example, and a dielectric layer 32 made of $Al_2O_3$ is formed over the surface of the anode body 31, whereby an element is formed.

Next, the just-described element is immersed into a chemical polymerization solution composed of 3,4-ethylenedioxythiophene, ferric p-toluenesulfonate, and 1-butanol, to form a cathode layer 33 composed of polythiophene over the dielectric layer 32. Thereafter, a carbon layer 34 and a silver paste layer 35 are successively formed over the cathode layer 33, to thus complete a capacitor element 30 (aluminum single plate element).

Next, capacitor elements 30 are placed onto the lead frame 12 in the manner as illustrated in FIG. 5. At this time, the anode portion 30a of the capacitor element 30 is electrically connected to the anode mounting parts 7a and 7b of the lead frame 12 by resistance welding, and the anode portions 30a are electrically connected to one another also by resistance welding. On the other hand, the cathode portion 30b of the capacitor element 30 is electrically connected to the cathode mounting part 6 of the lead frame 12 by a conductive adhesive, and the cathode portions 30b are electrically connected also by a conductive adhesive.

After two sets of four capacitor elements 30 are staked on the lead frame 12, the anode terminal 11 and the cathode terminal 10 are cut off at the locations indicated by the two-dot chain lines 19 in FIG. 3, and then, the lead frame 12 is bent into an angular C-shape at the notches 13 so that the joint part 9 is disposed on one side of the capacitor elements 30, as illustrated in FIG. 6. Thereby, the eight capacitor elements 30 are layered without being deformed. Thereafter, the anode terminal 11 and the cathode terminal 10 are bent, and the bent surfaces 27a, 27b of the anode terminal 11 are welded together, followed by forming the exterior resin 8 thereover. Thus, a multi-layered solid electrolytic capacitor as illustrated in FIG. 1, in which portions of the anode terminal 11 and the cathode terminal 10 are exposed outside the exterior resin 8, is fabricated in this manner.

It should be noted that the number of the layers of the capacitor elements 30 in the anode mounting part 7a and that in the anode mounting part 7b need not be the same, although both numbers are the same in this example. Moreover, in the later-described case wherein the capacitor comprises three or more anode mounting parts as well, it is not necessary that all the numbers be the same.

Modified Example 1

The lead frame 12 shown in FIG. 7 has the same configuration as described in the foregoing Best Mode for Carrying Out the Invention, except that it is provided with a corresponding number of cathode mounting parts 6 that corresponds to the number of the anode mounting parts 7b. It should be noted that the parts having the same functions as those in the foregoing Best Mode are designated by the same reference numerals. Specifically, the cathode mounting parts 6, which have the same shape, are disposed parallel to each other at a predetermined gap, as with the parallel arrangement construction of the anode mounting parts 7a and 7b. In such a lead frame 12, the four upper capacitor elements 30 of the eight capacitor elements 30 are also electrically connected to one of the cathode mounting parts 6, as in the case of the four lower capacitor elements 30, as illustrated in FIG. 8.

By employing this construction, both the anodes and the cathodes of the capacitor elements 30 can be retained stably when stacking the capacitor elements 30 and when bending the lead frame 12.

As illustrated in FIG. 9, it is also possible to employ the configuration in which the cathode mounting parts 6, 6 are joined by a joint part 21, like the anode mounting parts 7a, 7b, and the lead frame 12 between adjacent cathode mounting parts 6, 6 is bent into an angular C-shape. By employing this configuration, the above-described advantageous effects are exhibited more noticeably.

Modified Example 2

As illustrated in FIG. 10, this example has the same configuration as described in the foregoing Best Mode for Carrying Out the Invention, except that only one notch 13a is provided between the anode mounting parts 7a and 7b of the lead frame 12.

With such a lead frame 12, a multi-layered solid electrolytic capacitor is fabricated by bending the lead frame in the opposite direction, i.e., inside out, to the direction described in the foregoing Best Mode. As a result, the anode mounting part 7a and the anode mounting part 7b are connected by a very short joint part 9 (i.e., having substantially the same length as the total thickness of the two anode mounting parts 7a and 7b).

It should be noted that, in the just-described configuration, although a gap forms between a set of the capacitor elements 30 and the cathode mounting part 6, a conductive adhesive 14 is interposed in the gap as illustrated in FIG. 11 and FIG. 12 to electrically connect the cathode mounting part 6 and the cathode portion 30b that is adjacent to the cathode mounting part 6.

Modified Example 3

This example has the same configuration as described in the above-described modified example 1, except that one additional cathode mounting part 6 and one additional anode mounting part 7b are provided in the lead frame, as illustrated in FIG. 13 (i.e., three cathode mounting parts and three anode mounting parts are provided).

Specifically, as illustrated in FIG. 14, one of the anode mounting parts 7b is bent over in the same direction as that in the above-described modified example 1, while the other one of the anode mounting parts 7b is bent over in the opposite direction to that in the above-described modified example 1. This configuration makes it possible to mount a greater number of capacitor elements 30.

The number of sets of three anode mounting parts 7a, 7b, 7b may be 4 or 5, or may be increased, if necessary, to any number as long as the design permits. In this case, the bending may be such that the anode mounting part is bent successively in one direction to the other.

Other Embodiments (1) In the foregoing embodiments, a notch or notches 13 is/are formed at a boundary between the anode mounting part 7a and the joint part 9 and/or a boundary between the anode mounting part 7b and the joint part 9, for making it easy to bend the lead frame 12; however, the notch or notches 13 is/are not necessarily essential in the configuration of the present invention.

(2) In the foregoing embodiments, the cathode-side restricting wall portion 17c and the anode-side restricting wall portion 18c are provided; however, the restricting wall portions 17c and 18c are not necessarily essential in the configuration of the present invention.

(3) The valve metal is not limited to aluminum as described above but may also be tantalum, niobium, and the like. The solid electrolyte layer is not limited to a polythiophene-based conductive polymer, but may also be one of a polypyrrole-based conductive polymer, a polyaniline-based conductive polymer, a polyfuran-based conductive polymer, and manganese dioxide.

INDUSTRIAL APPLICABILITY

Although the present invention may be applied to chip capacitors mounted on a printed circuit board, the invention may be applicable to various other fields.

DESCRIPTION OF REFERENCE NUMERALS

Figure 1:
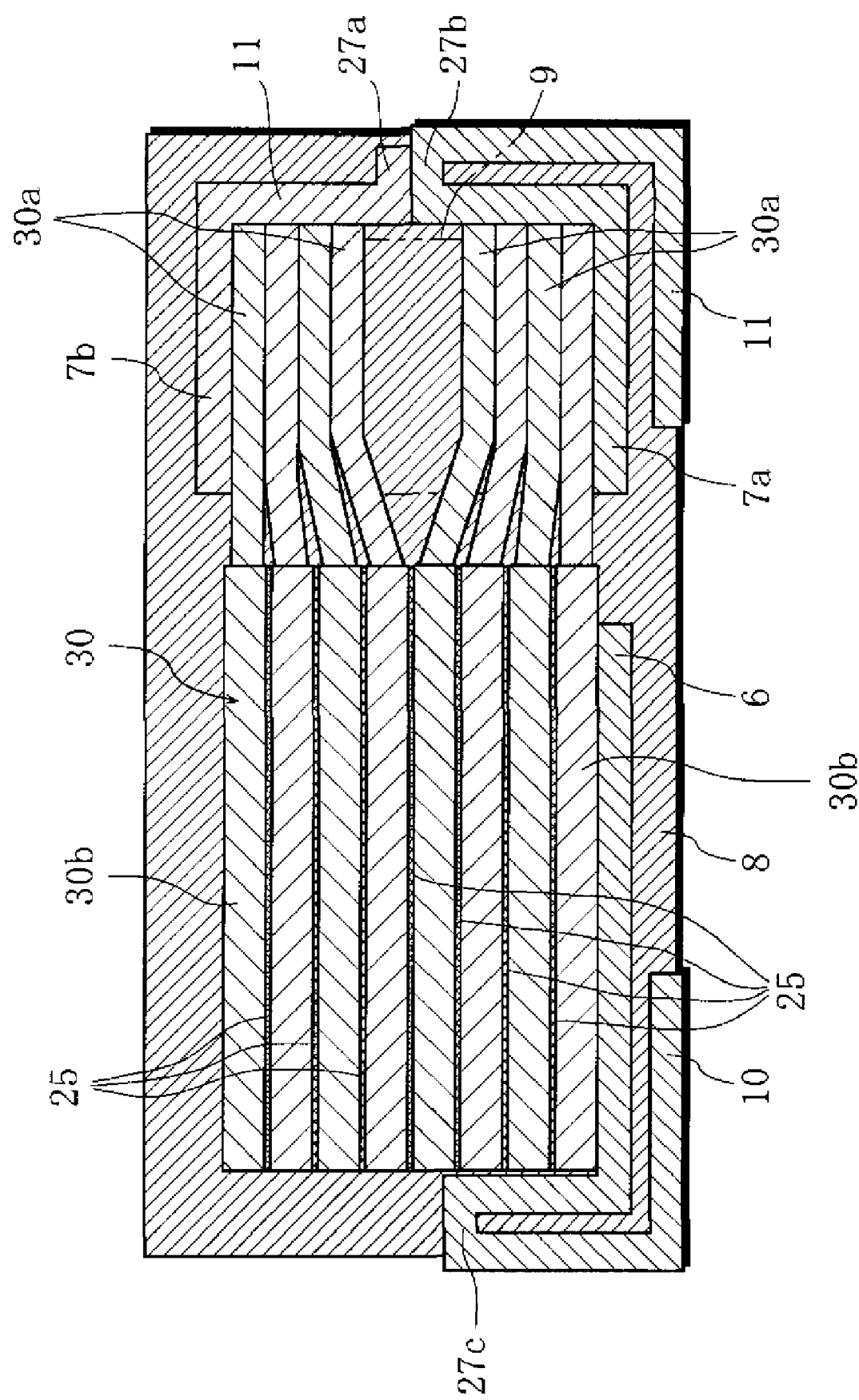
FIG. 1 is a vertical cross-sectional view of a multi-layered solid electrolytic capacitor according to the present invention.
Figure 2:
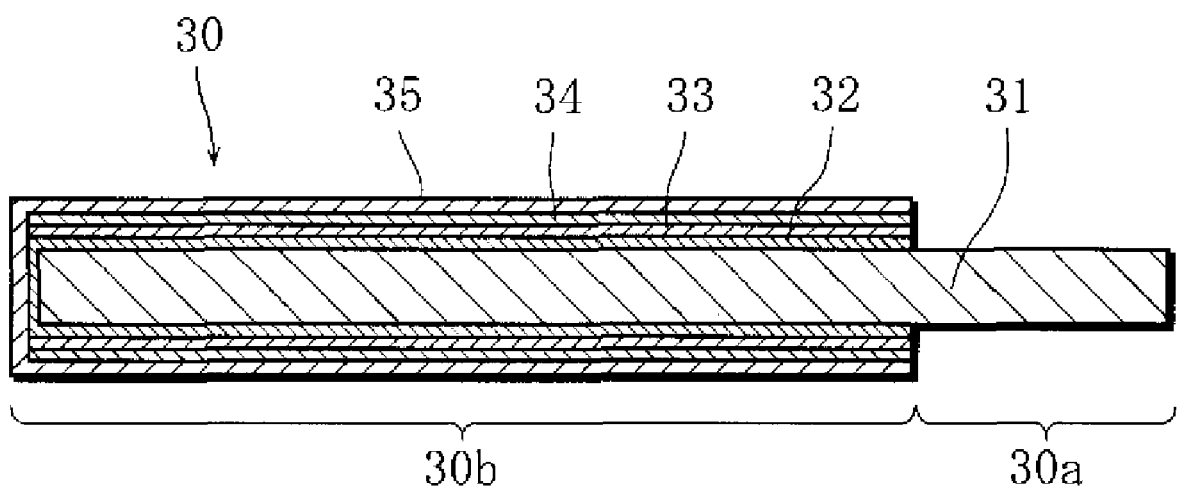
FIG. 2 is a vertical cross-sectional view of a capacitor element used in the multi-layered solid electrolytic capacitor according to the present invention.
Figure 3:
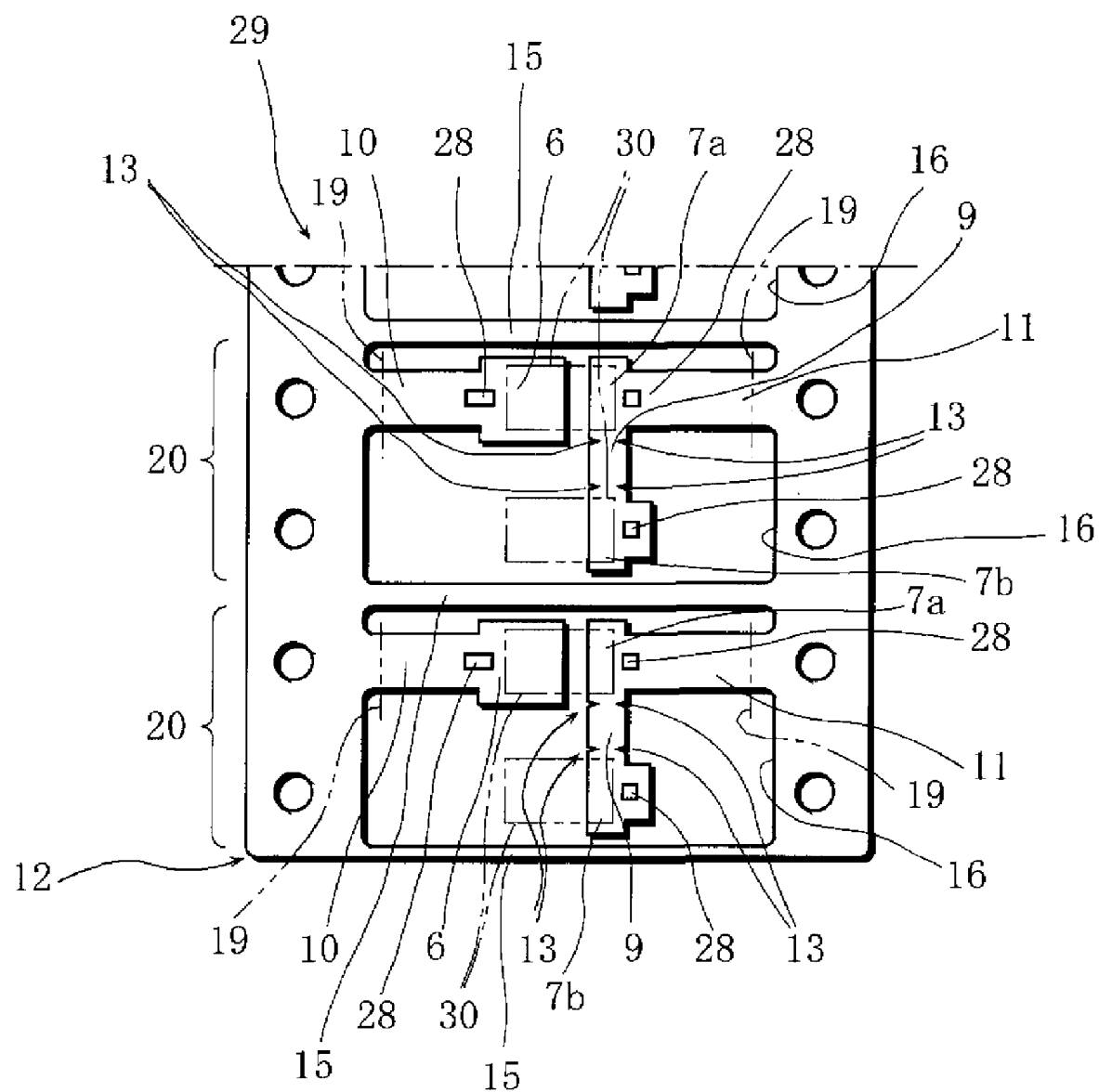
FIG. 3 is a plan view of a lead frame of the multi-layered solid electrolytic capacitor according to the present invention.
Figure 4:
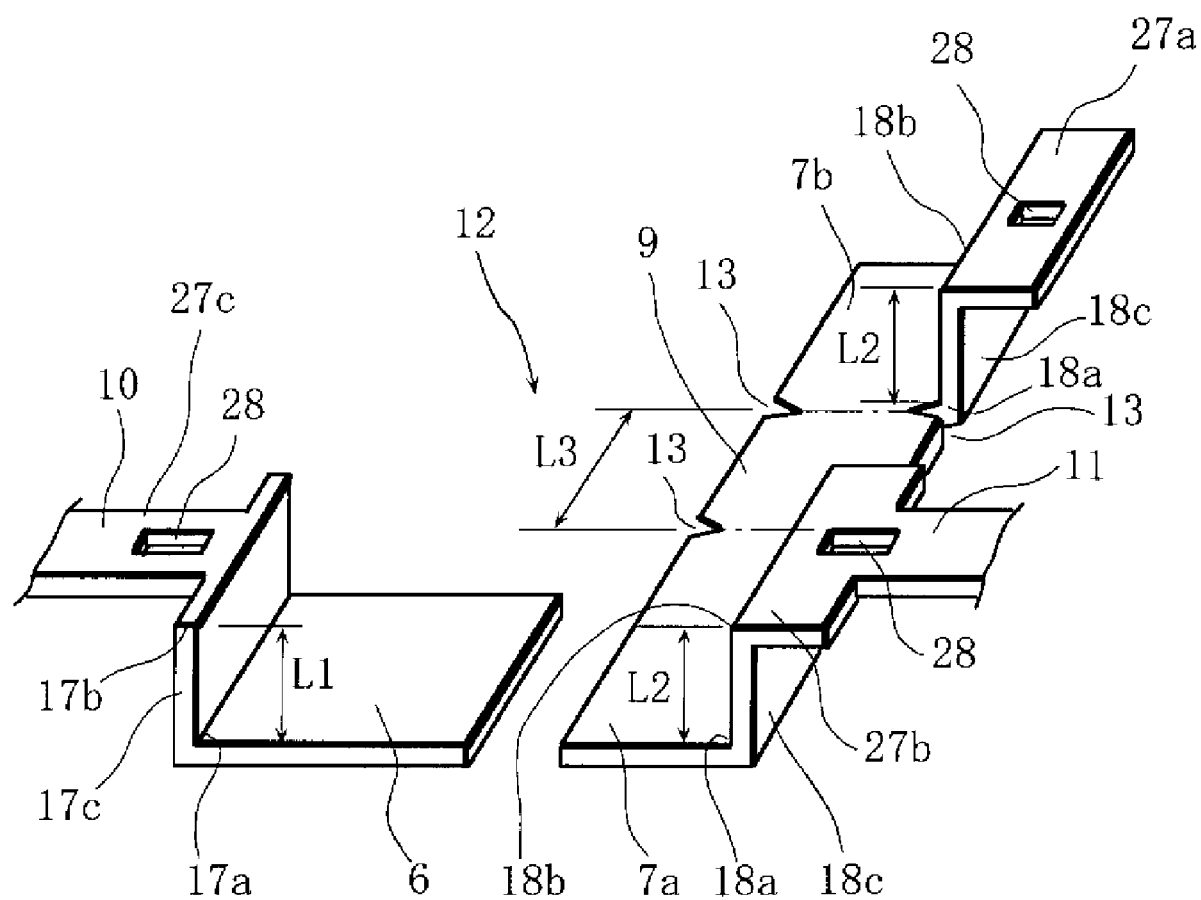
FIG. 4 is a perspective view illustrating a primary portion of the lead frame, shown in FIG. 3, of the multi-layered solid electrolytic capacitor according to the present invention.
Figure 5:
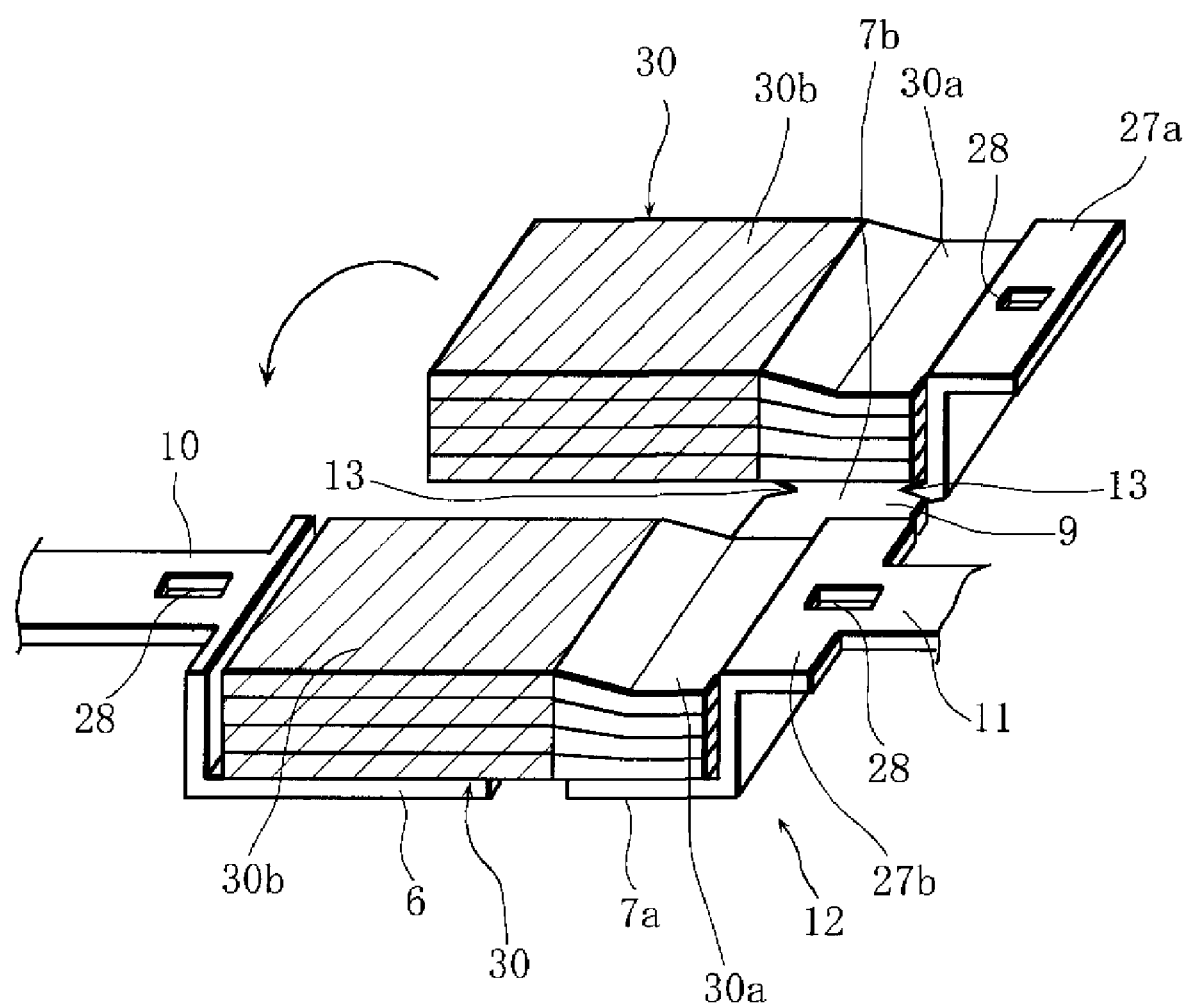
FIG. 5 is a perspective view illustrating one process step of a manufacturing method of a multi-layered solid electrolytic capacitor according to the present invention.
Figure 6:
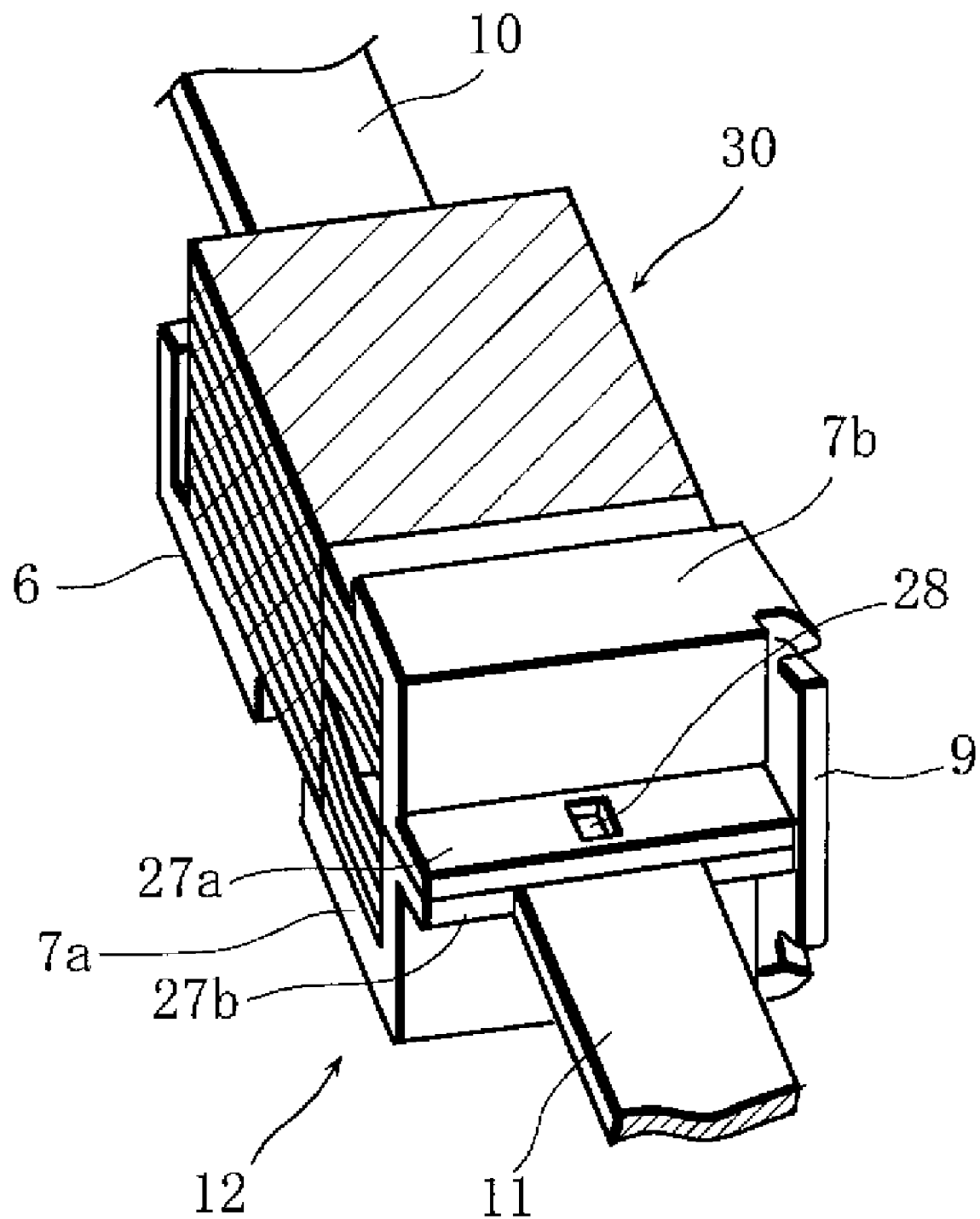
FIG. 6 is a perspective view illustrating one process step of a manufacturing method of a multi-layered solid electrolytic capacitor according to the present invention.
Figure 7:
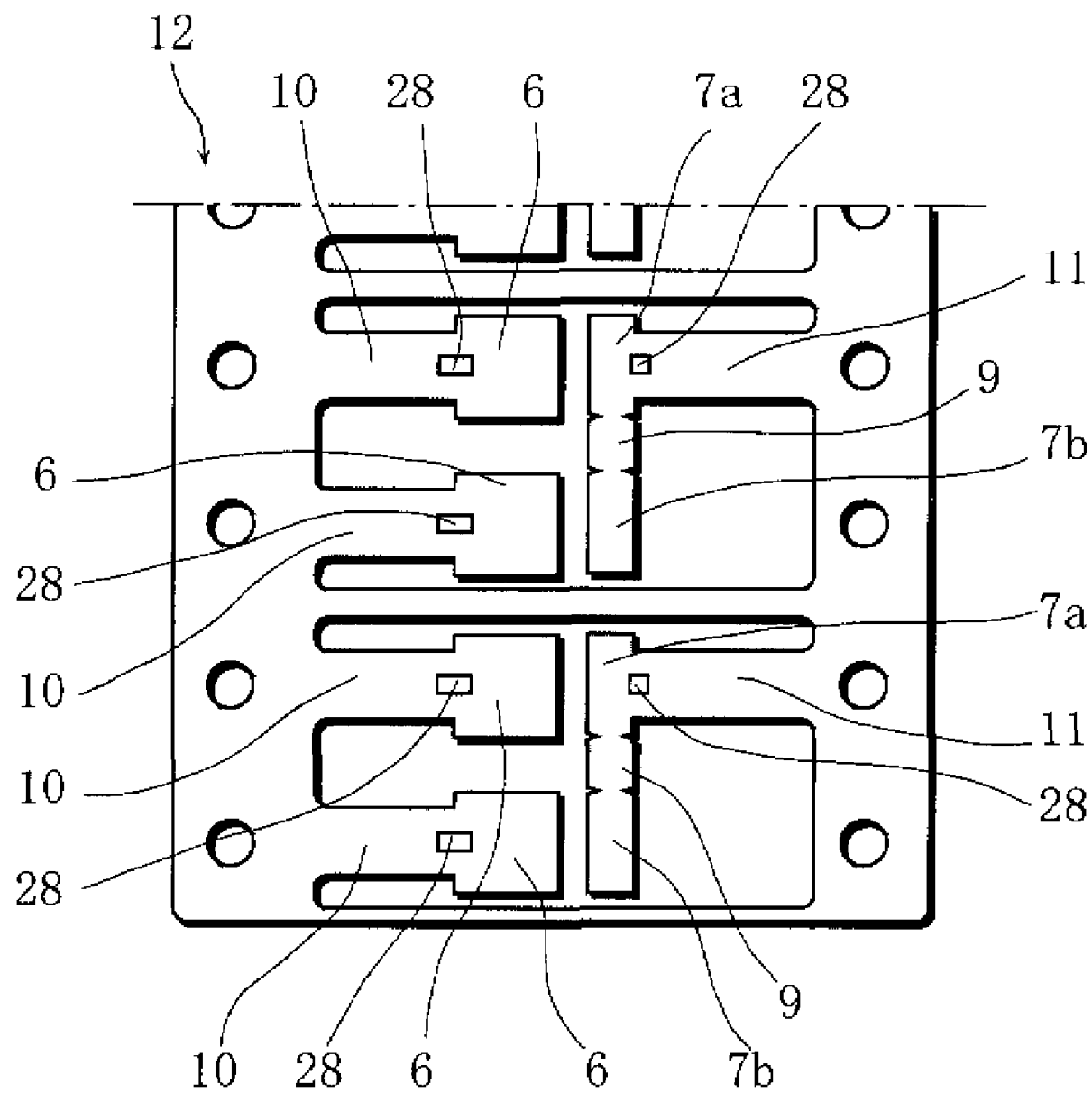
FIG. 7 is a plan view of a lead frame used in a multi-layered solid electrolytic capacitor of a modified example 1.
Figure 8:
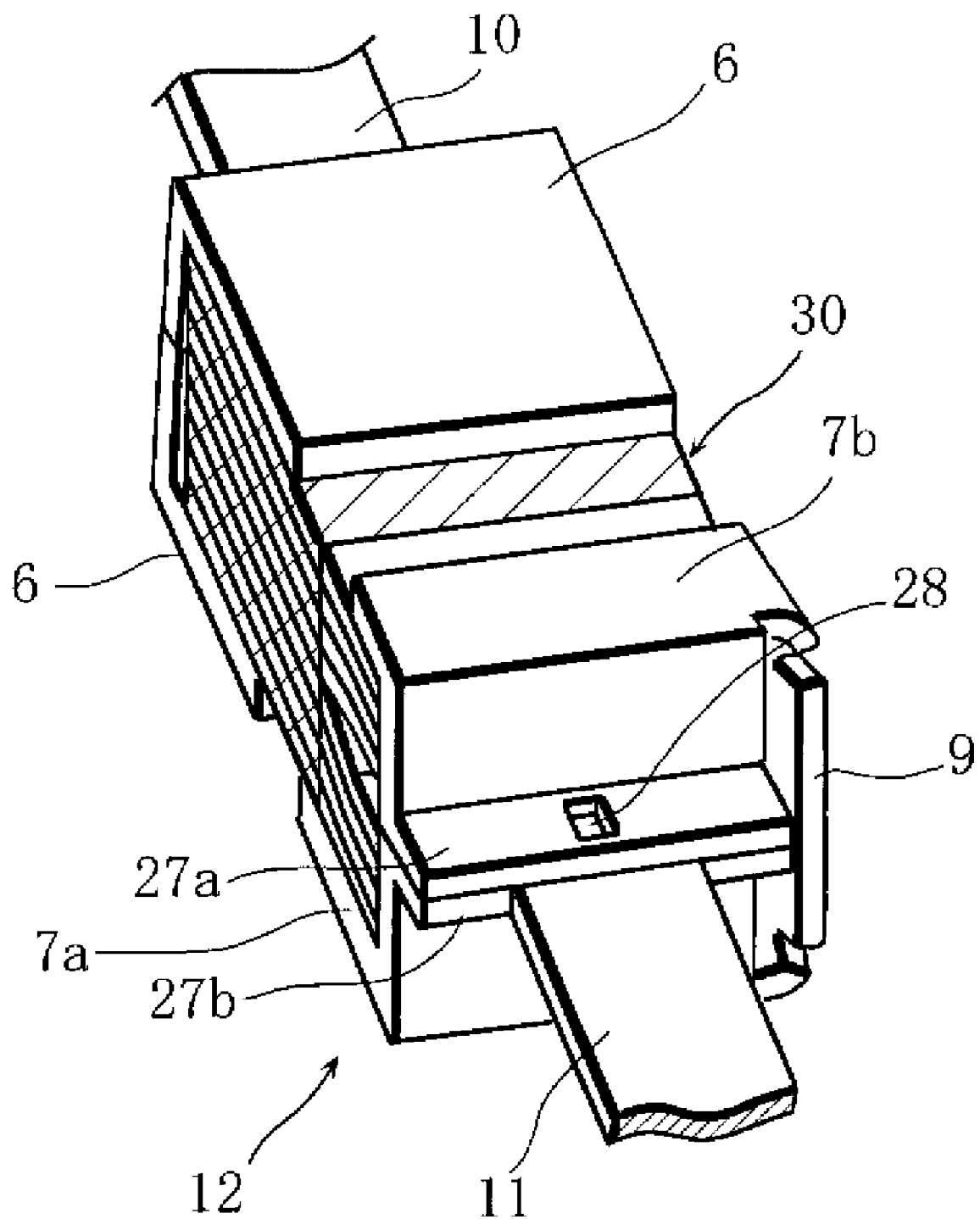
FIG. 8 is a perspective view illustrating one process step of a manufacturing method of the multi-layered solid electrolytic capacitor of the modified example 1.
Figure 9:
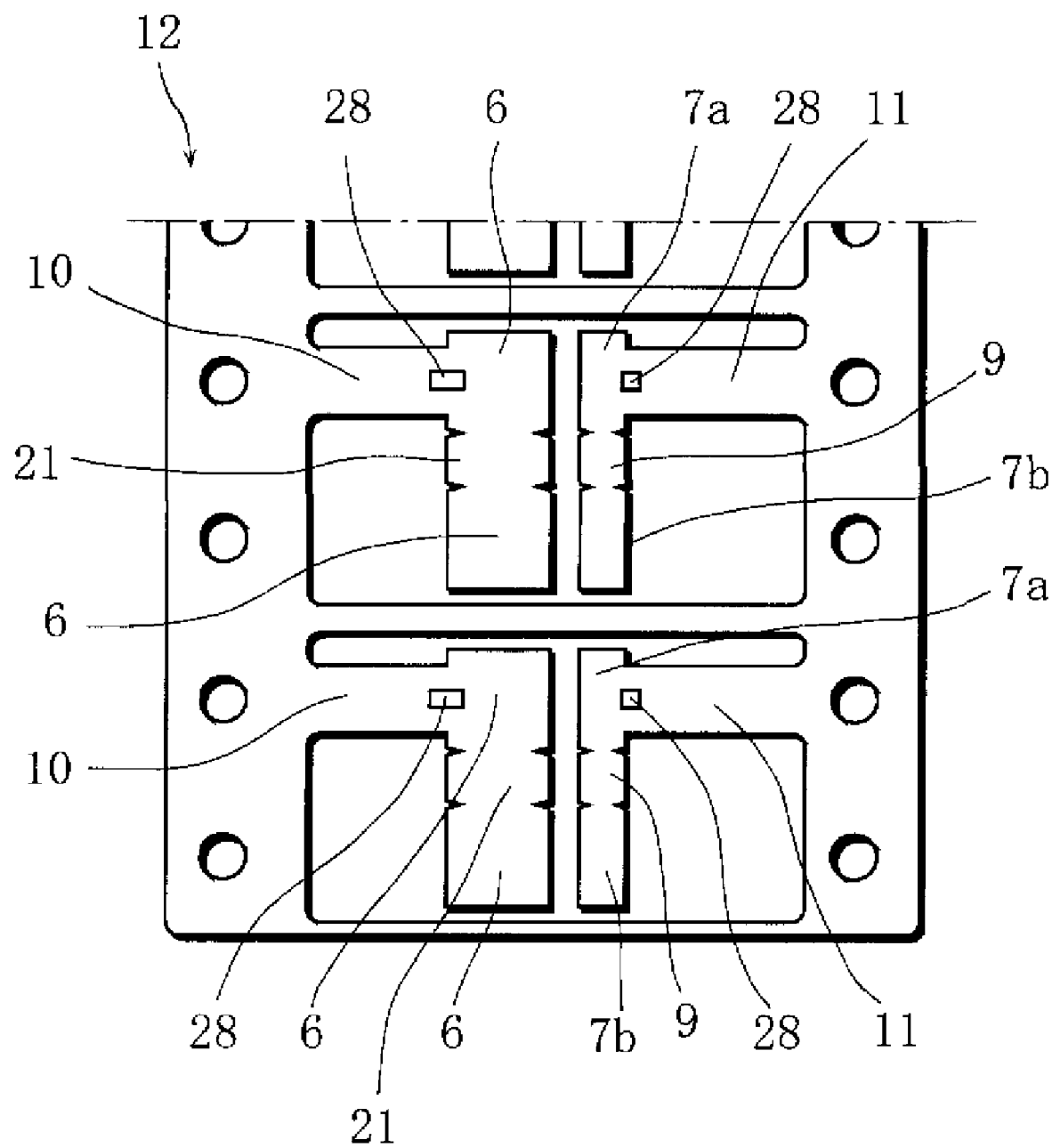
FIG. 9 is a plan view of another embodiment of the lead frame used in the multi-layered solid electrolytic capacitor of the modified example 1.
Figure 10:
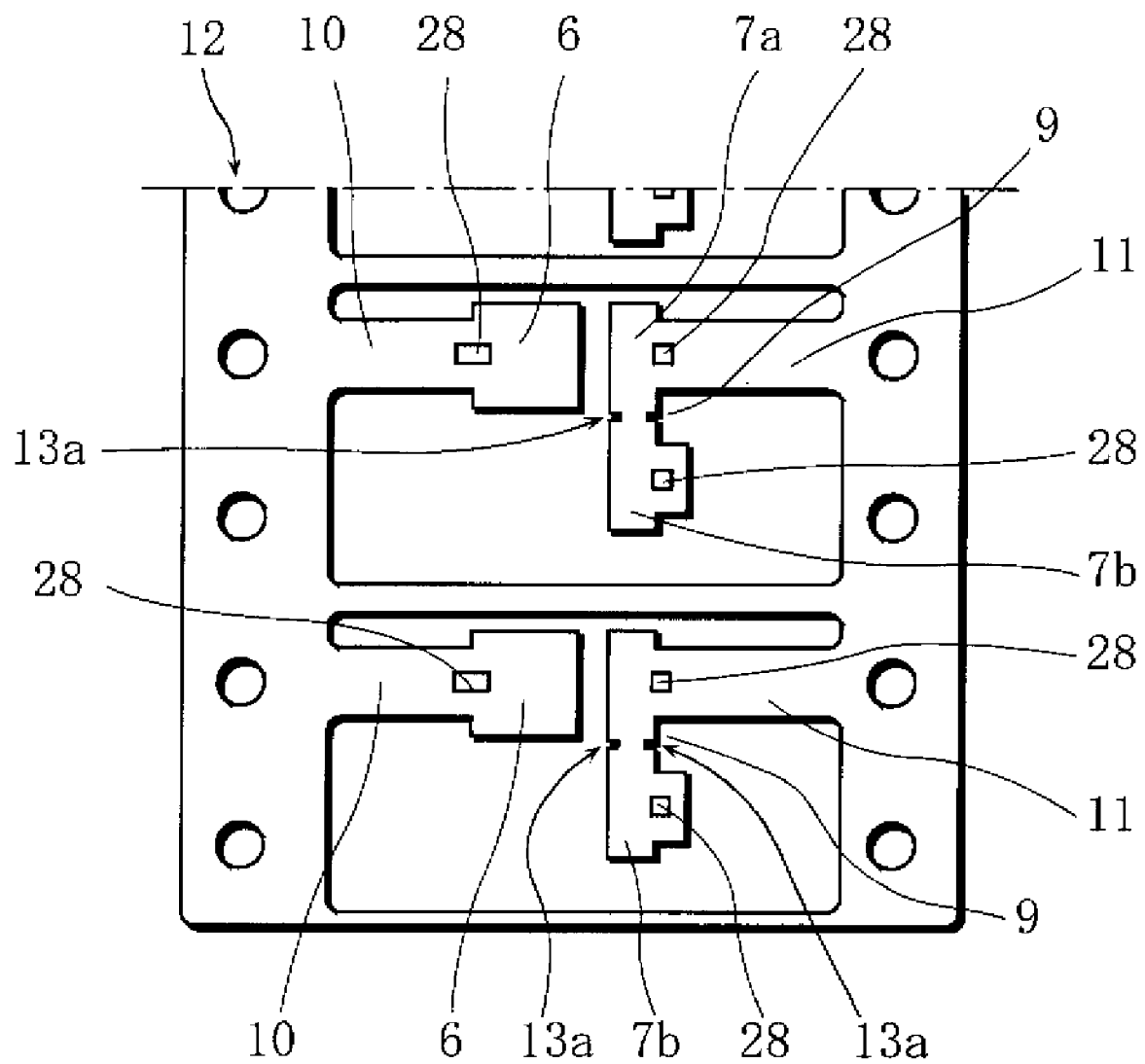
FIG. 10 is a plan view of a lead frame used in a multi-layered solid electrolytic capacitor of a modified example 2.
Figure 11:
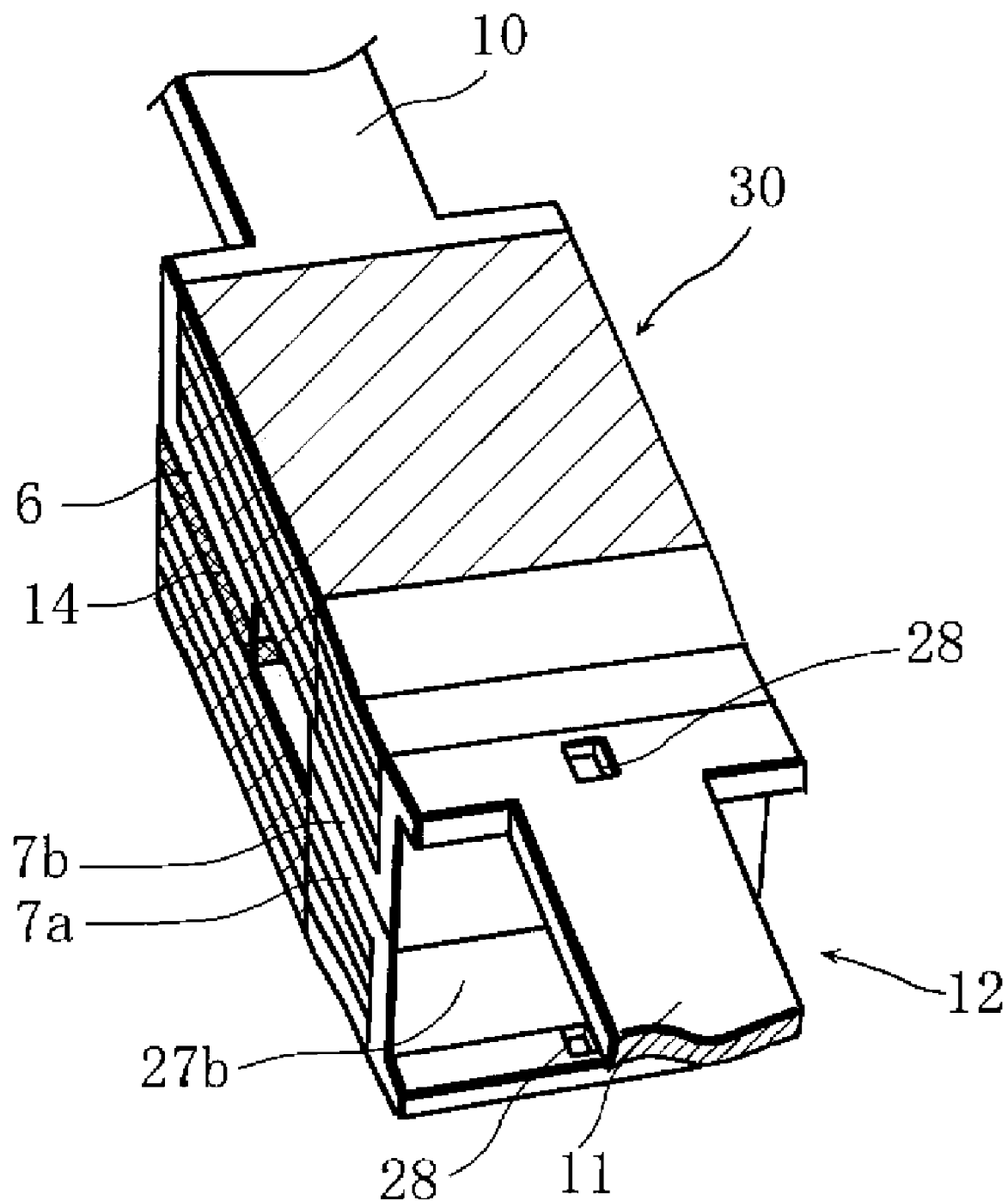
FIG. 11 is a perspective view illustrating one process step of a manufacturing method of the multi-layered solid electrolytic capacitor of the modified example 2.
Figure 12:
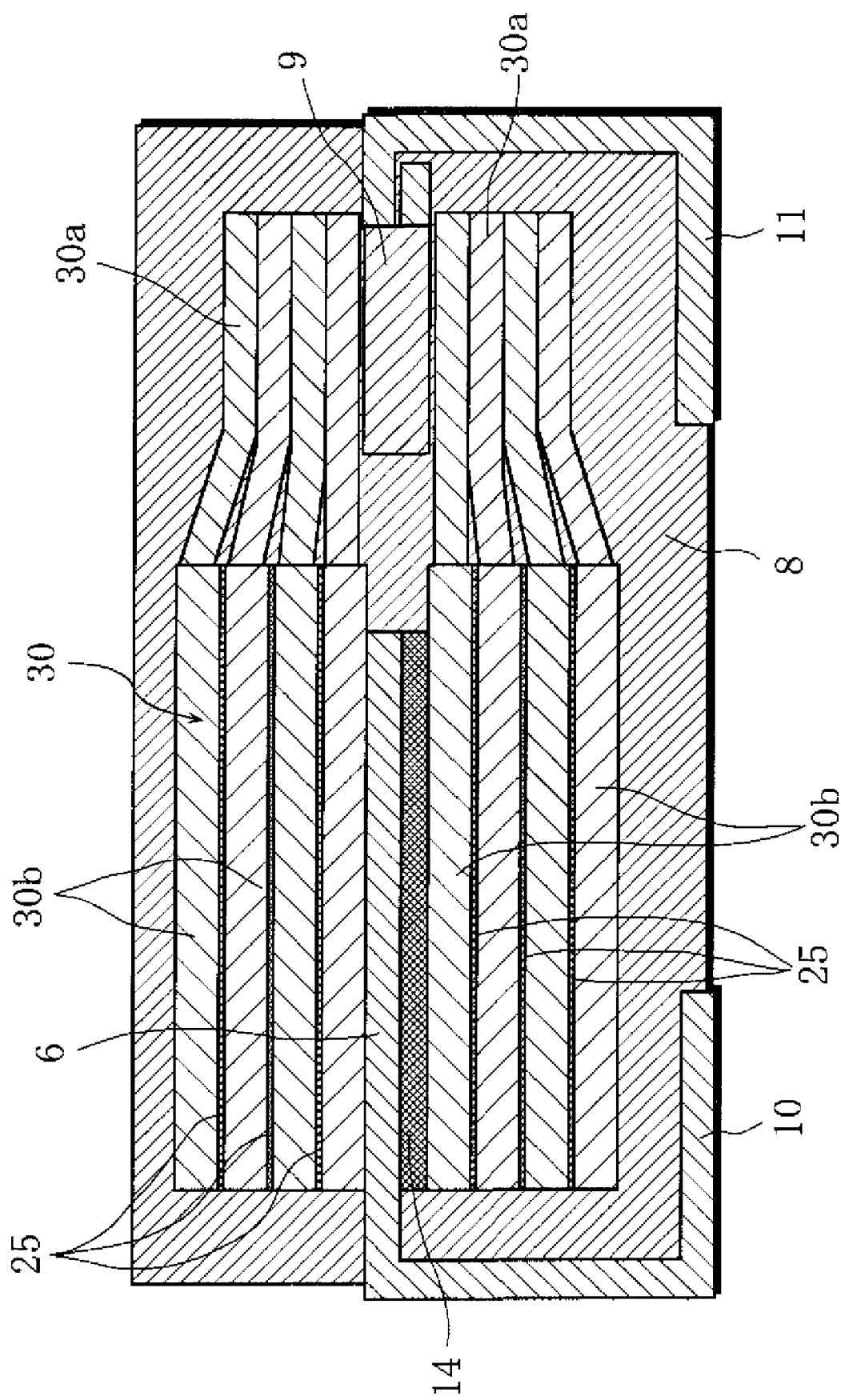
FIG. 12 is a vertical cross-sectional view illustrating one process step of the manufacturing method of the multi-layered solid electrolytic capacitor of the modified example 2.
Figure 13:
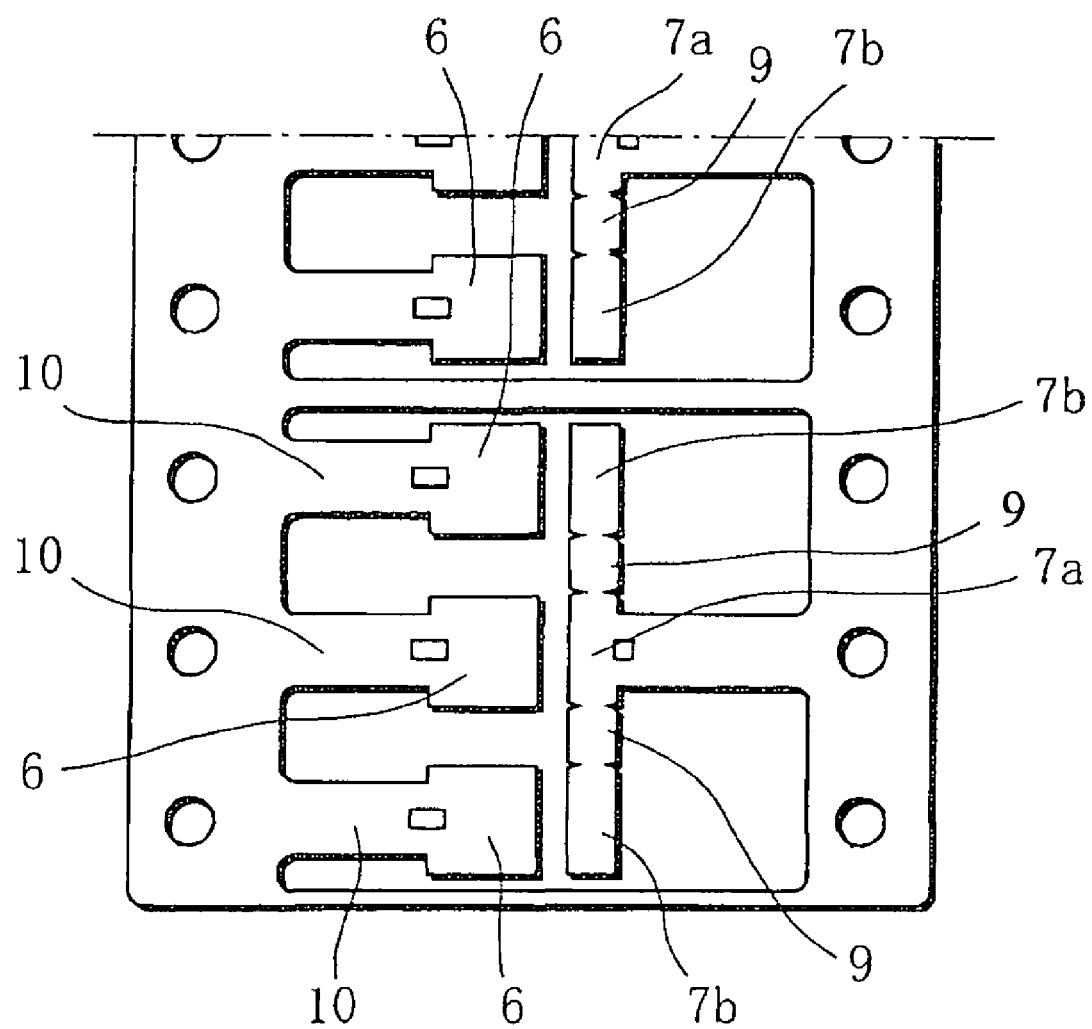
FIG. 13 is a plan view of a lead frame used in a multi-layered solid electrolytic capacitor of a modified example 3.
Figure 14:
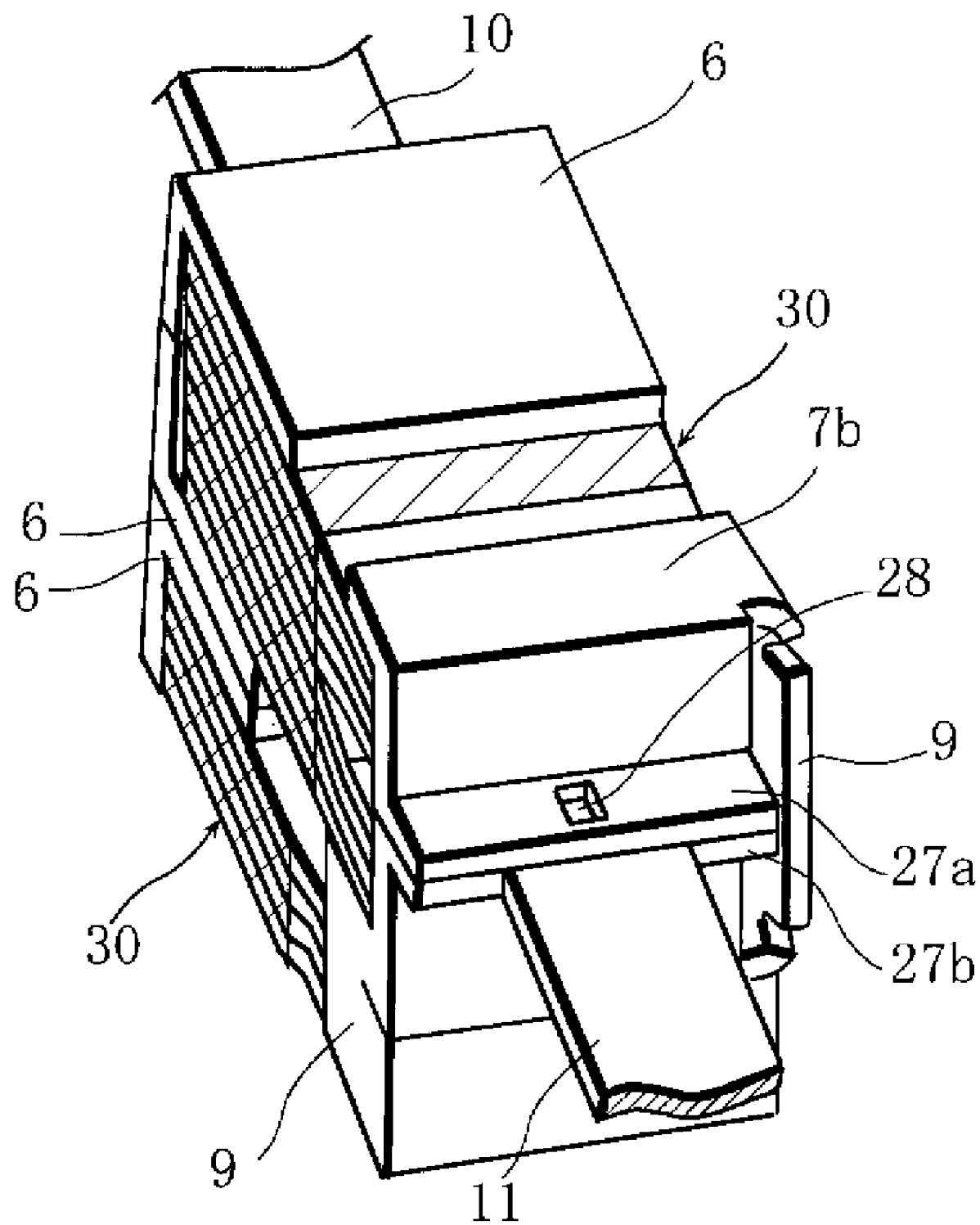
FIG. 14 is a perspective view illustrating one process step of a manufacturing method of the multi-layered solid electrolytic capacitor of the modified example 3.
Figure 15:
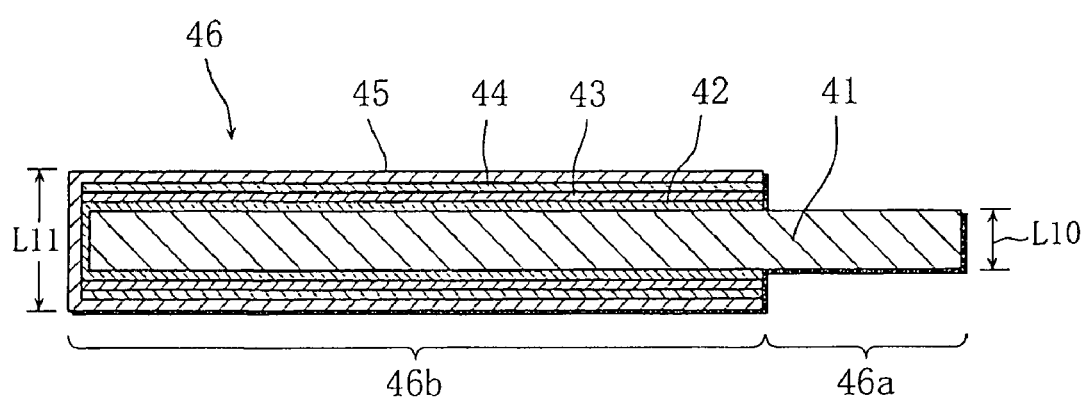
FIG. 15 is a vertical cross-sectional view of a capacitor element used in a conventional multi-layered solid electrolytic capacitor.
Figure 16:
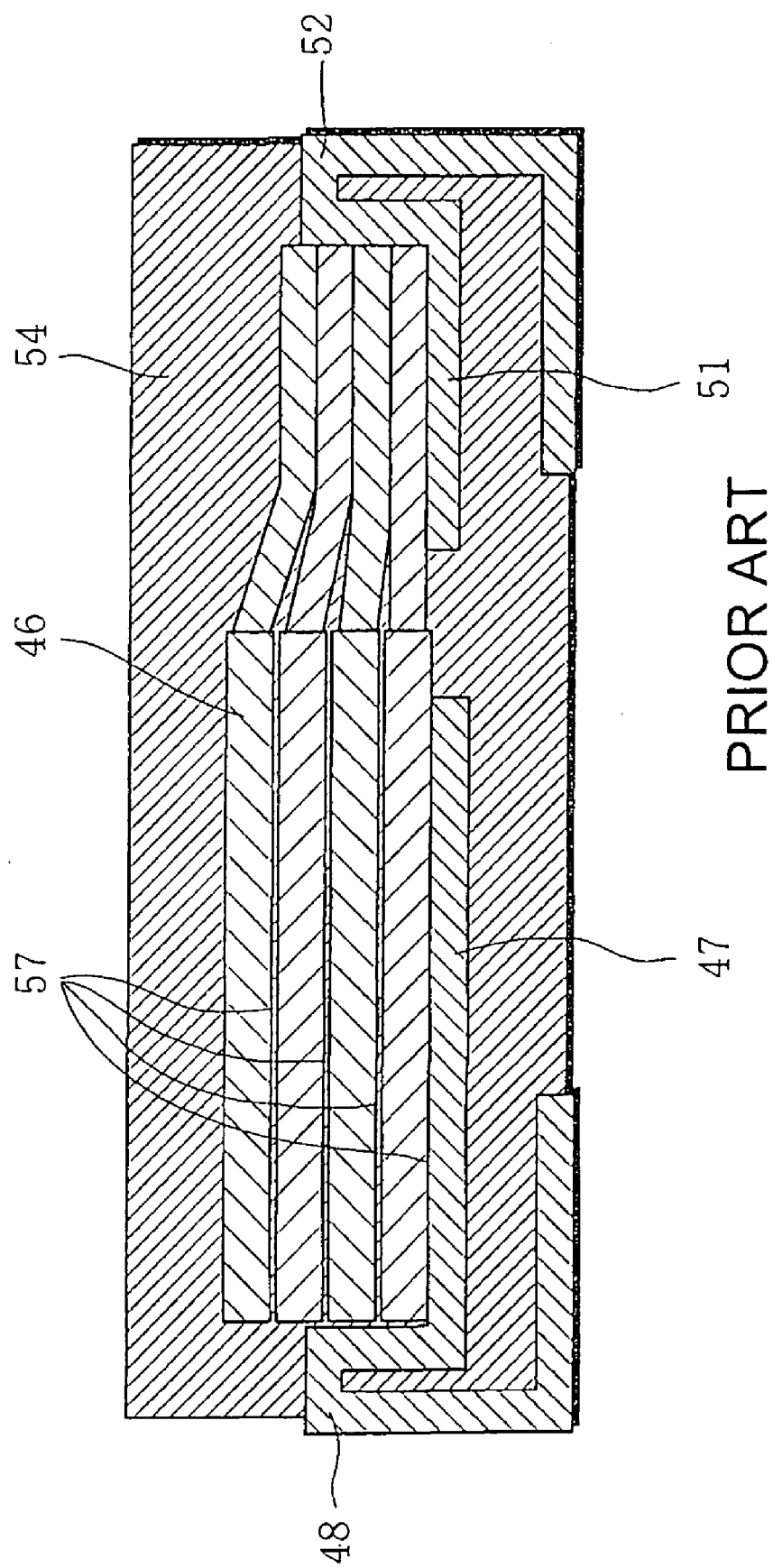
FIG. 16 is a vertical cross-sectional view of a conventional multi-layered solid electrolytic capacitor.
Figure 17:
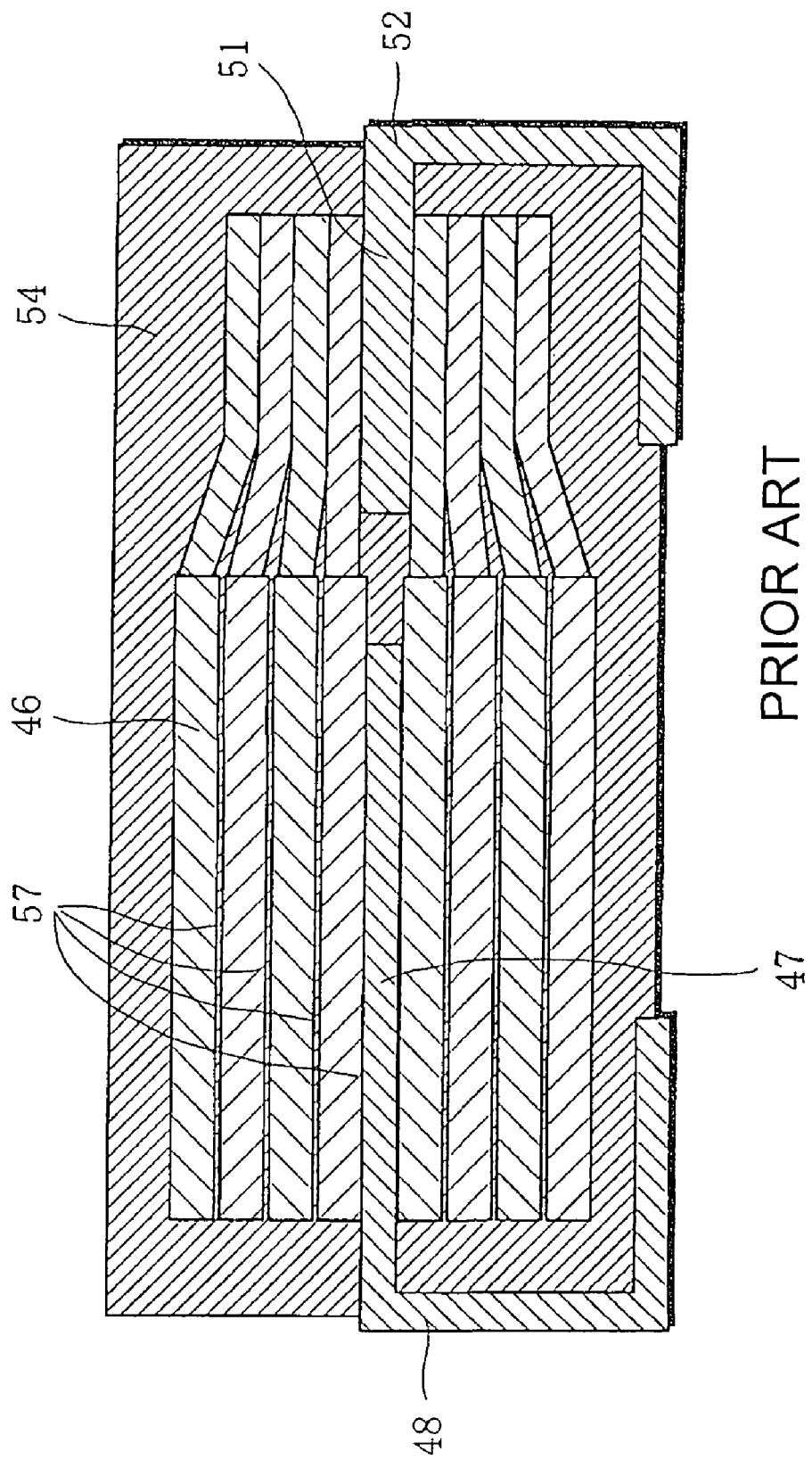
FIG. 17 is a vertical cross-sectional view illustrating another embodiment of the conventional multi-layered solid electrolytic capacitor.

1: anode body
2: dielectric layer
3: cathode layer
5: silver paint layer
6: cathode mounting part
7a: anode mounting part
7b: anode mounting part
8: exterior resin
9: conductive adhesive
10: cathode terminal
11: anode terminal
12: lead frame
30: capacitor element (aluminum single plate element)
30a: anode portion
30b: cathode portion (main body part)

The invention claimed is:

1. A multi-layered solid electrolytic capacitor comprising:
a plurality of capacitor elements, each comprising an anode body having an anode portion and a cathode portion having a dielectric oxide film and a cathode layer formed in succession on a surface of the anode body, the plurality of capacitor elements being stacked on top of one another to form at least two groups of the capacitor elements,
a plurality of the anode mounting parts are provided in an anode terminal, the anode mounting parts are disposed parallel to each other, and
adjacent anode mounting parts are joined to each other by a joint part integrally formed with the adjacent anode mounting parts by bending a metal plate,
wherein anode portions of each group of the capacitor elements are weld-secured all together to an adjacent one of said plurality of the anode mounting parts provided in said anode terminal without interposing any other members between the anode portions and the anode mounting parts.

2. The multi-layered solid electrolytic capacitor according to claim 1, wherein adjacent cathode portions of the capacitor elements are electrically connected to each other by a conductive adhesive, and a cathode mounting part that is electrically connected to a cathode terminal is electrically connected to a cathode portion of the capacitor element disposed on the cathode mounting part also by the conductive adhesive.

3. The multi-layered solid electrolytic capacitor according to claim 2, wherein the anode mounting surfaces of the adjacent anode mounting parts are opposed to each other, and the height of the joint part that joins the anode mounting parts having the anode mounting surfaces is controlled to be substantially the same as the total thickness of the capacitor elements existing between the adjacent anode mounting parts.

4. The multi-layered solid electrolytic capacitor according to claim 2, wherein opposite surfaces to the anode mounting surfaces of the adjacent anode mounting parts are disposed in contact with each other, and the height of the joint part that joins the anode mounting parts having the anode mounting surfaces is controlled to be substantially the same as the total thickness of two anode mounting parts.

5. The multi-layered solid electrolytic capacitor according to claim 2, wherein, at a boundary of the anode terminal to the anode mounting part, a restricting wall portion is formed along the same direction as the stacking direction of the capacitor elements.

6. The multi-layered solid electrolytic capacitor according to claim 1, wherein the angle formed by the adjacent anode mounting parts and the joint part for joining the anode mounting parts is restricted to be a substantially right angle.

7. The multi-layered solid electrolytic capacitor according to claim 6, wherein the anode mounting surfaces of the adjacent anode mounting parts are opposed to each other, and the height of the joint part that joins the anode mounting parts having the anode mounting surfaces is controlled to be substantially the same as the total thickness of the capacitor elements existing between the adjacent anode mounting parts.

8. The multi-layered solid electrolytic capacitor according to claim 6, wherein opposite surfaces to the anode mounting surfaces of the adjacent anode mounting parts are disposed in contact with each other, and the height of the joint part that joins the anode mounting parts having the anode mounting surfaces is controlled to be substantially the same as the total thickness of two anode mounting parts.

9. The multi-layered solid electrolytic capacitor according to claim 6, wherein, at a boundary of the anode terminal to the anode mounting part, a restricting wall portion is formed along the same direction as the stacking direction of the capacitor elements.

10. The multi-layered solid electrolytic capacitor according to claim 1, wherein opposite surfaces to the anode mounting surfaces of the adjacent anode mounting parts are disposed in contact with each other, and the height of the joint part that joins the anode mounting parts having the anode mounting surfaces is controlled to be substantially the same as the total thickness of two anode mounting parts.

11. The multi-layered solid electrolytic capacitor according to claim 1, wherein, at a boundary of the anode terminal to the anode mounting part, a restricting wall portion is formed along the same direction as the stacking direction of the capacitor elements.

12. A multi-layered solid electrolytic capacitor comprising:
a plurality of capacitor elements, each comprising an anode body having an anode portion and a cathode portion having a dielectric oxide film and a cathode layer formed in succession on a surface of the anode body, the plurality of capacitor elements being stacked on top of one another and the anode portions being weld-secured to anode mounting surfaces of anode mounting parts provided in an anode terminal,
the multi-layered solid electrolytic capacitor characterized in that:
a plurality of the anode mounting parts are provided therein, the anode mounting parts are disposed parallel to each other,
adjacent anode mounting parts are joined to each other by a joint part integrally formed with the adjacent anode mounting parts, and
notches are formed at boundaries between the joint part and the anode mounting parts.

13. The multi-layered solid electrolytic capacitor according to claim 12, wherein opposite surfaces to the anode mounting surfaces of the adjacent anode mounting parts are disposed in contact with each other, and the height of the joint part that joins the anode mounting parts having the anode mounting surfaces is controlled to be substantially the same as the total thickness of two anode mounting parts.

14. The multi-layered solid electrolytic capacitor according to claim 12, wherein, at a boundary of the anode terminal to the anode mounting part, a restricting wall portion is formed along the same direction as the stacking direction of the capacitor elements.

15. A multi-layered solid electrolytic capacitor comprising:
a plurality of capacitor elements, each comprising an anode body having an anode portion and a cathode portion having a dielectric oxide film and a cathode layer formed in succession on a surface of the anode body, the plurality of capacitor elements being stacked on top of one another and the anode portions being weld-secured to anode mounting surfaces of anode mounting parts provided in an anode terminal,
the multi-layered solid electrolytic capacitor characterized in that:
a plurality of the anode mounting parts are provided therein, the anode mounting parts are disposed parallel to each other,
adjacent anode mounting parts are joined to each other by a joint part integrally formed with the adjacent anode mounting parts,
opposite surfaces to the anode mounting surfaces of the adjacent anode mounting parts are disposed in contact with each other, the height of the joint part that joins the anode mounting parts having the anode mounting surfaces is controlled to be substantially the same as the total thickness of two anode mounting parts, and
a notch is formed at a center part of the joint part.

16. A multi-layered solid electrolytic capacitor comprising:
a plurality of capacitor elements, each comprising an anode body having an anode portion and a cathode portion having a dielectric oxide film and a cathode layer formed in succession on a surface of the anode body, the plurality of capacitor elements being stacked on top of one another and the anode portions being weld-secured to anode mounting surfaces of anode mounting parts provided in an anode terminal, the multi-layered solid electrolytic capacitor characterized in that:

a plurality of the anode mounting parts are provided therein, the anode mounting parts are disposed parallel to each other, adjacent anode mounting parts are joined to each other by a joint part integrally formed with the adjacent anode mounting parts, both adjacent anode terminals are bent-formed in an angular C-shape, and the adjacent anode terminals are weld-secured to each other at the bent portions.

17. A multi-layered solid electrolytic capacitor comprising:

a plurality of capacitor elements, each comprising an anode body having an anode portion and a cathode portion having a dielectric oxide film and a cathode layer formed in succession on a surface of the anode body, the plurality of capacitor elements being stacked on top of one another and the anode portions being weld-secured to anode mounting surfaces of anode mounting parts provided in an anode terminal, the multi-layered solid electrolytic capacitor characterized in that:

a plurality of the anode mounting parts are provided therein, the anode mounting parts are disposed parallel to each other, adjacent anode mounting parts are joined to each other by a joint part integrally formed with the adjacent anode mounting parts, adjacent cathode portions of the capacitor elements are electrically connected to each other by a conductive adhesive, a cathode mounting part that is electrically connected to a cathode terminal is electrically connected to a cathode portion of the capacitor element disposed on the cathode mounting part also by the conductive adhesive, and the same number of cathode mounting parts as that of the anode mounting parts is provided.

18. A method of manufacturing a multi-layered solid electrolytic capacitor, comprising:

a first step of forming a dielectric oxide film and a cathode layer in succession over a portion of a surface of an anode body to prepare a plurality of capacitor elements each comprising a cathode portion and an anode portion in which the anode body is in an exposed state, and preparing a lead frame that has a plurality of anode mounting parts and in which adjacent anode mounting parts are joined by a joint part;

a second step of stacking the plurality of capacitor elements on the anode mounting parts of the lead frame and weld-securing the anode mounting parts to an anode portion and the anode portions to each other without interposing any other members therebetween; and a third step of bending the lead frame so that adjacent anode mounting parts are disposed parallel to each other.

19. The method of manufacturing a multi-layered solid electrolytic capacitor according to claim 18, wherein in the first step, the lead frame is prepared so that the length of the joint part is substantially the same as the total thickness of the capacitor elements existing between two anode mounting parts joined to the joint part, and in the third step, the lead frame is bent so that adjacent anode mounting surfaces are opposed to each other.

20. A method of manufacturing a multi-layered solid electrolytic capacitor comprising:

a first step of forming a dielectric oxide film and a cathode layer in succession over a portion of a surface of an anode body to prepare a plurality of capacitor elements each comprising a cathode portion and an anode portion in which the anode body is in an exposed state, and preparing a lead frame that has a plurality of anode mounting parts and in which adjacent anode mounting parts are joined by a joint part;

a second step of stacking the plurality of capacitor elements on the anode mounting parts of the lead frame and weld-securing the anode mounting parts to an anode portion and the anode portions to each other; and a third step of bending the lead frame so that adjacent anode mounting parts are disposed parallel to each other, wherein in the first step, the lead frame is prepared so that the length of the joint part is substantially the same as the total thickness of two anode mounting parts, and in the third step, the lead frame is bent so that adjacent two opposite surfaces to the anode mounting surfaces are disposed in contact with each other.

\* \* \* \* \*